United States Patent
Schneider et al.

(10) Patent No.: US 10,024,977 B1
(45) Date of Patent: Jul. 17, 2018

(54) LOW SPEED HEADING MEASUREMENT (71) Applicant: Ag Leader Technology, Ames, IA (US)

(72) Inventors: Michael Schneider, Ames, IA (US); Dave Willett, Ames, IA (US)

(73) Assignee: Ag Leader Technology, Inc., Ames, IA (US)

( * ) Notice: Subject to any disclaimer, the term of this patent is extended or adjusted under 35 U.S.C. 154(b) by 137 days.

(21) Appl. No.: 15/047,067

(22) Filed: Feb. 18, 2016

Related U.S. Application Data (60) Provisional application No. 62/117,510, filed on Feb. 18, 2015.

(51) Int. Cl.
| | |
|---|---|
| B62D 6/00 | (2006.01) |
| B62D 11/00 | (2006.01) |
| G01S 19/42 | (2010.01) |
| A01B 69/04 | (2006.01) |

(52) U.S. Cl.
CPC ............ G01S 19/42 (2013.01); A01B 69/008 (2013.01)

(58) Field of Classification Search
CPC .................................. B60D 1/36; B65G 67/24
See application file for complete search history.

(56) References Cited

U.S. PATENT DOCUMENTS

| | | | |
|---|---|---|---|
| 6,631,321 B1 | 10/2003 | Ciprian | |
| 6,792,363 B1* | 9/2004 | Bye ...................... | G05D 1/0005 701/2 |
| 7,860,628 B2 | 12/2010 | Lange | |
| 8,140,223 B2 | 3/2012 | Whitehead et al. | |
| 9,141,111 B2 | 9/2015 | Webber et al. | |
| 9,182,237 B2 | 11/2015 | Morin et al. | |
| 9,250,086 B1 | 2/2016 | Friend et al. | |
| 2006/0195238 A1* | 8/2006 | Gibson ............... | A01B 69/008 701/23 |
| 2009/0121932 A1 | 5/2009 | Whitehead et al. | |
| 2010/0185366 A1* | 7/2010 | Heiniger .............. | A01B 69/008 701/50 |
| 2012/0283909 A1* | 11/2012 | Dix ......................... | B60D 1/36 701/41 |
| 2013/0211658 A1* | 8/2013 | Bonefas ................. | B65G 67/24 701/28 |
| 2014/0214275 A1 | 7/2014 | Miller et al. | |

* cited by examiner

Primary Examiner — Redhwan K Mawari
Assistant Examiner — Rodney P King
(74) Attorney, Agent, or Firm — McKee, Voorhees & Sease, PLC (57) ABSTRACT

Methods, apparatus, and systems for use in agricultural equipment with automatic steering control. One method includes the steps of calculating a heading to provide greater accuracy than heading information obtained from the GNSS system or calculated in an equivalent manner using GNSS locations at successive sample periods and using the heading in providing automatic steering control, swath control, or rate control of planting, spraying, or other application functions for the agricultural equipment.

27 Claims, 6 Drawing Sheets

LOW SPEED HEADING MEASUREMENT

CROSS-REFERENCE TO RELATED APPLICATIONS

This application claims the benefit of Provisional Application U.S. Ser. No. 62/117,510, filed Feb. 18, 2015, all of which is herein incorporated by reference in its entirety.

FIELD OF THE INVENTION

The present invention relates to agricultural equipment with automatic steering control.

BACKGROUND OF THE INVENTION

Agricultural equipment with automatic steering control requires a constantly updated heading measurement for the navigation system. Traditional GPS receivers produce a heading measurement with every GPS update, but the error of the heading measurement increases dramatically as vehicle speed falls below 1 mph and approaches zero. This is because the heading measurement is based on the change in vehicle position from one GPS update to the next, and as speed approaches zero, the change in vehicle position during the GPS sample period becomes small in relation to GPS measurement error. Discussion of such things as automatic steering systems, including GPS (GNSS) sub-systems, can be found in such U.S. patents and published applications as: U.S. Pat. No. 9,141,111B2 to inventors Webber et al., U.S. Pat. No. 7,860,628B2 to inventor Lange, and US2014/0214275A1 to inventors Miller et al., each of which is incorporated by reference herein in its entirety.

Where a single antenna GPS is used, heading measurement becomes very noisy as the speed drops below about 1 mph. Although a dual antenna GPS system may be used to provide a more accurate heading measurement at low and zero speed, the equipment adds significant cost. Examples of multiple antenna GNSS positioning sub-systems can be found at US2009/0121932A1 to inventor Whitehead and U.S. Pat. No. 8,140,223B2 to assignee Hemisphere GGS LLC, each of which is incorporated by reference herein in its entirety.

What is needed are methods, apparatuses, and systems which allow for accurate heading measurements, even at low speeds.

SUMMARY OF THE INVENTION

Therefore, it is a primary object, feature, or advantage of the present invention to improve over the state of the art.

It is a further object, feature, or advantage to provide for accurate heading measurements, even at low speeds.

It is a still further object, feature, or advantage to improve accuracy of a navigation system.

Another object, feature, or advantage is to improve steering control.

Yet another object, feature, or advantage is to provide improved heading measurement while only using a single antenna GPS (or other Global Navigation Satellite System (GNSS)).

A still further object, feature, or advantage is to produce a more accurate heading determination when a vehicle starts up.

One or more of these and/or other objects, features, or advantages of the present invention will become apparent from the specification and claims that follow. The present invention is not to be limited to or by these objects, features, and advantages. It is to be further understood that different embodiments may have different objects, features, or advantages and no single embodiment need meet each and every object, feature, or advantage provided herein.

According to one aspect, a method is provided. The method includes the steps of receiving GNSS heading information from a GNSS system and determining if the GNSS heading information from the GNSS system is sufficiently accurate. If the heading information from the GNSS system is not sufficiently accurate, then updating the previously calculated heading determination to provide greater accuracy.

According to another aspect, a method is provided. The method includes the steps of determining heading from a GNSS position when change in position relative to stored position coordinates is sufficient for acceptable heading error and if the heading from the GNSS position is not acceptable, determining heading by adding a change in heading to a previously determined heading.

According to another aspect, a control system adapted for determining heading is provided. The control system includes a single antenna GNSS system, a processor operatively connected to the single antenna GNSS system and configured to receive as input from the single antenna GNSS system position coordinates latitude and longitude, a velocity, and a heading. The control system further includes a steer angle sensor operatively connected to the processor and wherein the processor is configured to receive a steer angle as input from the steer angle sensor or steer angle sensing system. Alternatively, the processor may receive another signal representing the amount of steering or the rate of turning, since all agricultural vehicles do not have steered wheels. The processor is programmed to determine heading by using the heading from the single antenna GNSS system when a speed is greater than a threshold. The processor is further programmed to determine the change in heading using the turning rate which may be calculated using the steer angle from the steer angle sensor when the speed is below a threshold and the change in position relative to stored coordinates is not sufficient for acceptable calculation of heading.

According to another aspect, a method for use in agricultural equipment with automatic steering control is provided. The method includes receiving heading information based on data from a GNSS system, determining whether or not to use the heading information from the GNSS system, and if the heading information from the GNSS system is not used, then calculating a heading to provide greater accuracy than the heading information from the GNSS system.

According to another aspect, a control system adapted for determining heading, the control system includes a single antenna GNSS system, a processor operatively connected to the single antenna GNSS system and configured to receive as input from the single antenna GNSS system position coordinates latitude and longitude, a velocity, and a heading, wherein the processor is configured to receive a yaw rate as input. The process is further programmed to determine heading by using the heading from the single antenna GNSS system when a speed is greater than a threshold and programmed to determine a change in heading using the yaw rate when the speed is below a threshold and the change in position relative to stored coordinates is not sufficient for acceptable calculation of heading.

According to another aspect, a method includes storing position coordinates and determining heading from a current position and the stored position coordinates when there is a sufficient change in position between the current position and the stored position coordinates to provide an accurate heading determination.

According to another aspect, a method for use in agricultural equipment with automatic steering control and configured to receive information from a Global Navigation Satellite System (GNSS) is provided. The method includes calculating a heading to provide greater accuracy than heading information obtained from the GNSS system and using the heading in providing automatic steering control for the agricultural equipment.

According to another aspect, a control system adapted for determining heading is provided. The control system includes a single antenna GNSS system, a processor operatively connected to the single antenna GNSS system, and a steer angle sensor operatively connected to the processor and wherein the processor is configured to receive a steer angle as input from the steer angle sensor. The processor is programmed to determine a change in heading using the steer angle from the steer angle sensor.

According to another aspect, a control system adapted for determining heading is provided. The control system includes a single antenna GNSS system and a processor operatively connected to the single antenna GNSS system. The processor is configured to receive a yaw rate as input. The processor is programmed to determine a change in heading using the yaw rate.

According to another aspect, a method is provided for use in agricultural equipment with automatic steering control and configured to receive information from a Global Navigation Satellite System (GNSS). The method includes calculating a heading to provide greater accuracy than heading information obtained from the GNSS system or calculated in an equivalent manner using GNSS locations at successive sample periods and using the heading in providing automatic steering control, swath control, or rate control of planting, spraying, or other application functions for the agricultural equipment.

According to another aspect, a method is provided for determining heading from a GNSS position when change in position relative to stored position coordinates is sufficient for acceptable heading error.

According to yet another aspect, a method includes storing position coordinates and determining heading from a current position and the stored position coordinates when there is a sufficient change in position between the current position and the stored position coordinates to provide an accurate heading determination.

DETAILED DESCRIPTION OF EXEMPLARY EMBODIMENTS OF THE INVENTION

A. Overview

For a better understanding of the invention, examples of forms and embodiments it can take will now be described in detail. It is to be understood that these examples are neither exclusive nor inclusive of all forms and embodiments. Variations obvious to those skilled in this technical art will be included within the invention.

The present invention is described with respect to Global Positioning System (GPS); however, GPS is merely one example of a Global Navigation Satellite System (GNSS). It is contemplated that any GNSS or analog may be used.

A GPS heading measurement is normally determined from the change in the current and previous position measurements. Assuming GPS position has been converted to an X-Y coordinate system, the travel direction can be calculated from the arctangent of the Y direction change and the X direction change. If side slip is negligible, the heading will align with travel direction when the vehicle is moving forward, and will be 180 degrees from the travel direction when the vehicle is moving in reverse gear. As the vehicle slows toward zero speed, however, the change in position for one sample period gets very small and becomes small compared to GPS measurement noise. This leads to increasing measurement error of the heading. Examples of steering control with GPS/GNSS have been referenced above and incorporated by reference. Patent filings such as U.S. Pat. No. 9,182,237B2 to inventors Morin, et al. also includes discussion of how GPS creates position updates and is incorporated by reference herein. Patent filings such as U.S. Pat. No. 6,631,321B1 to inventor Ciprian, and U.S. Pat. No. 9,250,086B1 to inventors Friend, et al. include discussion of how GPS sub-systems can calculate or estimate vehicle heading from GPS information; each of these is incorporated by reference herein.

The examples below will refer to steering of agricultural motive forces or vehicles, including those that have steerable wheels. It is be understood that the invention applies in analogous ways to vehicles that can be controlled directionally with treads or tracks, or otherwise, and to vehicles that not only pull or push implements but navigate on their own or in conjunction with other vehicles or ancillary machines.

B. Method Examples 1

A first concept of this invention is relatively simple: a new heading will not be calculated from the GPS coordinates until there has been a sufficient change in position to allow a calculation with acceptable error. To begin, the current GPS coordinates are stored in memory. Then at each GPS update, the change in position relative to the stored GPS coordinates is determined. If the change in position is less than a desired threshold, then the heading is not calculated using the new GPS position. When at a GPS update, the change in position relative to the stored GPS coordinates exceeds a threshold, a new heading is calculated using the current and stored GPS positions. The stored GPS position will then be updated.

A problem with this approach is that at very low speeds it may be several GPS update periods until a new heading is determined. If the vehicle is being steered in a tight turn during this time, the heading measurement will lag the actual heading. This problem is eliminated by the second concept of this invention, which is to update the previous heading measurement using the change in heading corresponding to the turning rate at those GPS update times when a heading measurement is not determined by the change in GPS position. This change in the heading is added to the previous heading measurement to produce the current heading measurement. If the vehicle is moving in reverse gear, then this calculated change in heading would be subtracted from the previous heading.

The change in heading since the previous GPS update period is based on the turning rate and can be determined as the distance traveled times the reciprocal of the turning radius. Distance traveled since the previous GPS update can be calculated as the change in GPS position or as the speed times the update period. For a front or rear wheel steered vehicle, the reciprocal of the turning radius is the tangent of the steer angle divided by the wheelbase. For other types of vehicles turning radius would be determined according to the turning geometry.

So the total solution is to determine heading from GPS position when the change in position relative to stored position coordinates is sufficient for acceptable heading error, and then to update the heading measurement using the change in heading corresponding to the turning rate at GPS update times when the position change is not sufficient to provide an accurate heading determination.

What is or is not sufficient for acceptable heading error can be determined in a variety of ways. The designer can define this according to need to desire. As indicated herein, there are known situations where reliance on GPS position measurements to derive heading can be less accurate than typical. One example is below a certain speed. Another is change in position of less than a pre-set threshold. It is also known that GPS information or signals can have a margin of error or noise which can produce error in heading estimations. Thus, reference herein to acceptable or sufficient/ sufficiently, or the like can be relative, can be set in the discretion of the designer, or otherwise. These terms are intended to convey that ordinary meaning—the quantity or state is acceptable or sufficient for a given parameter, situation, or designer, and can vary between designers, applications, or situations. The examples will give the reader insight into specific situations. As a general but non-limiting rule, acceptable heading error and sufficiently accurate heading calculations are those that empirically, by manufacturer's suggestion, or otherwise are within typical margin of error or noise of GPS systems, or in known operating situations such as very low (or no) speed or very low (or no) change of position per sampling period. Therefore, just the state of a machine (low speed or low change in position per time unit) can trigger an assumption of insufficiently accurate heading calculations or unacceptable heading error. There also may be situations where GPS position or heading estimations can be checked for accuracy against some reference or standard and an assumption of insufficient or unacceptable GPS measurements or estimations is triggered. But these are examples only.

As is known to and appreciated by those skilled in the art, accuracy of heading measurements from GNSS systems can vary for a number of reasons. Under ideal conditions, accuracy on the order of ½° (one-half degree) is possible, although around 1° is common, and worse than 1° occurs (e.g. 1°, 2°, or even more). And, of course, these variations can occur over time. It is not typical that accuracy below ½° is obtained consistently by GNSS. The techniques of the invention are not limited to any specific quantity or range of quantities for what is or is not sufficiently accurate heading measurements or estimations or acceptable heading errors from GNSS systems. However, in one example according to the invention, error of greater than ½° (one-half degree) could be the upper limit of what is sufficiently accurate or acceptable heading error, but this is not necessarily a limitation to the invention. In other implementations, it could be something above ½° (e.g. 1°). In some situations it could be above 1°. Therefore, sufficiently accurate or acceptable heading error is not necessarily limited to any value or range. A range of 0° to more than 1° is possible. A range of 0° to ½° or so is also possible. The foregoing is provided to give the reader some specific non-limiting examples for some possible implementations of the invention, but the invention is not necessarily limited thereto.

As will be appreciated by those skilled in the art, the low speed or change or distance trigger or threshold could vary according to the designer's need or desire. Although 1 mph or less for slow speed trigger has been mentioned, the invention is not limited thereto. For example, it could be higher. One possible range would be 2 mph or lower, but again it could be higher (e.g. 4 mph or lower). Change in position trigger or threshold could be at or on the order of 3 inches, but the invention is not limited to this. It could be higher (e.g. 7 inches or possibly more). The foregoing is provided to give the reader some specific non-limiting examples for some possible implementations of the invention, but the invention is not necessarily limited thereto.

C. Method Example 2

Figure 1A:
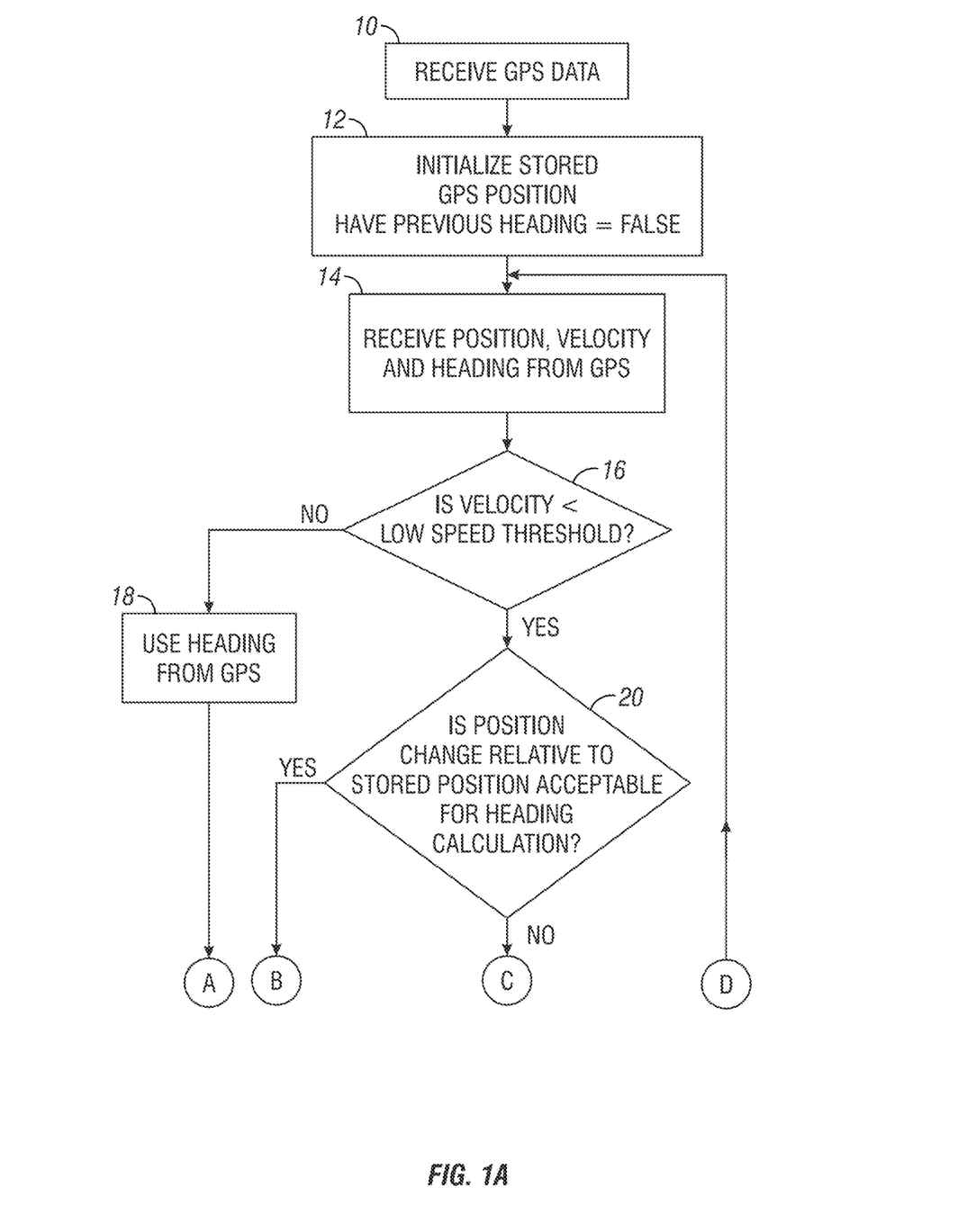
FIG. 1A and FIG. 1B illustrates a flow diagram of one example of a method for determining heading.
Figure 1B:
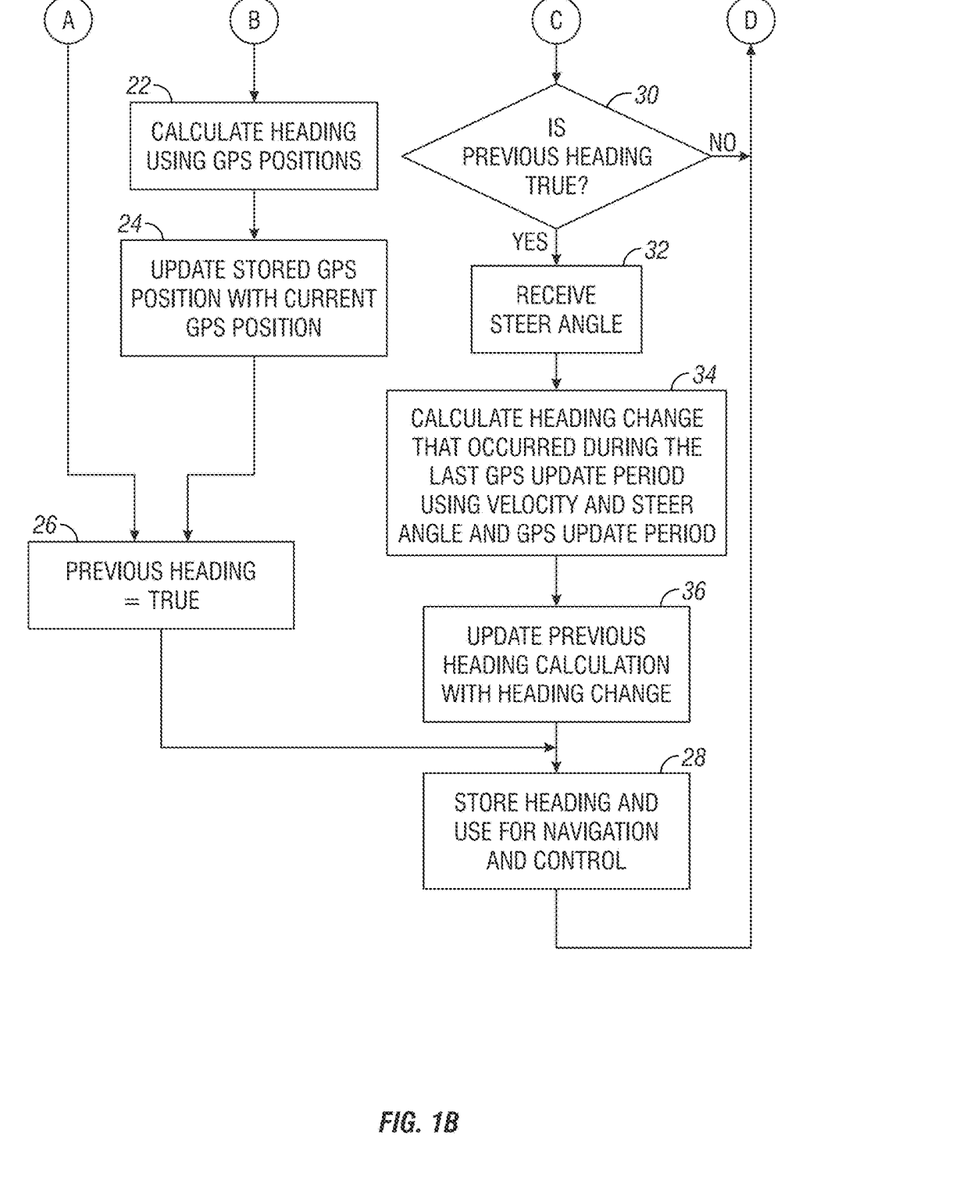

FIG. 1A and FIG. 1B illustrate a flow diagram of one example of a method for determining heading. The method allows for the heading from the GPS to be used when not at low speed. If at a low speed then instead of using the heading from the GPS, a heading is calculated. Under one set of conditions the heading can be calculated from GPS positions, under another set of conditions a heading change can be calculated and the previous heading calculation can be updated.

In step 10 GPS data is received. In step 12 an initialization is performed to initialize the stored GPS position and set the flag Have Previous Heading to false. In step 14 position, velocity and heading from the GPS is received. In step 16 a determination is made as to whether the velocity is less than a low speed threshold. If not, then in step 18 the heading from the GPS will be used and then in step 26 (See FIG. 1B) the Have Previous Heading flag is set to true.

Returning to FIG. 1A, step 16, if the velocity is less than the low speed threshold then in step 20 a determination is made as to whether the position change relative to the stored position is acceptable for heading calculation. If it is, then the process continues to step 22 (See FIG. 1B). In step 22 the heading is calculated using GPS positions. Then in step 24 the stored GPS position is updated with the current GPS position. Then in step 26 the flag Have Previous Heading is set to true. Then in step 28 the heading is stored and used for navigation and control. Returning to FIG. 1A, step 20, if the position change relative to the stored position is not acceptable for a heading calculation then in step 30 a determination is made as to whether the flag Have Previous Heading is true. If it is not, then the process loops back to step 14. If it is then in step 32 a steer angle is received. Then in step 34 the heading change that occurred during the last GPS update period is calculated such as through using velocity, steer angle, and the GPS update period. Next in step 36 the previous heading calculation is updated by adding the heading change. The process then continues to step 28 and the heading is stored and used for navigation and control. The process then loops back to step 14 to repeat.

D. Method Example 3

Figure 2A:
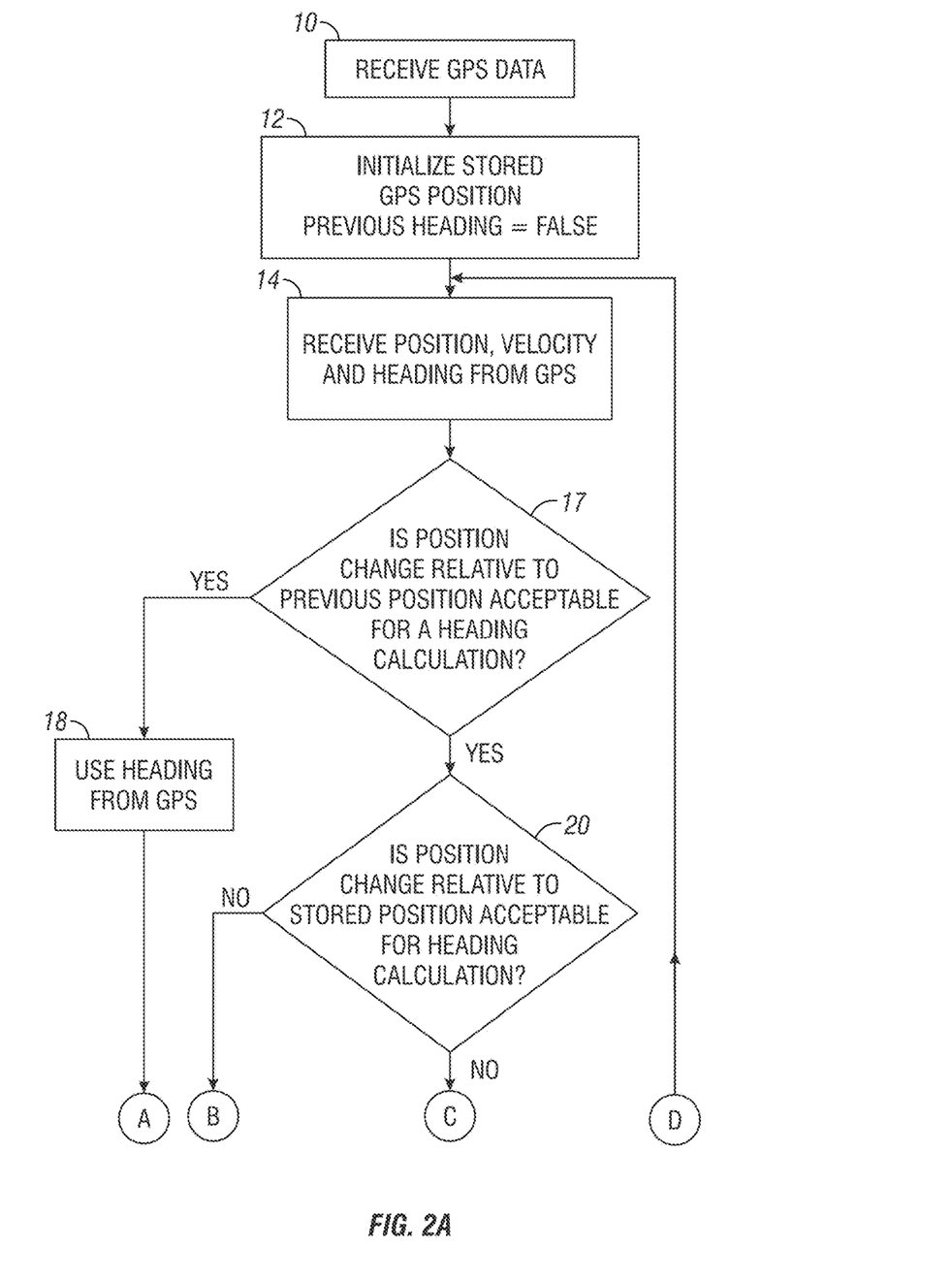
FIG. 2A and FIG. 2B illustrates another flow diagram of an example of a method for determining heading.
Figure 2B:
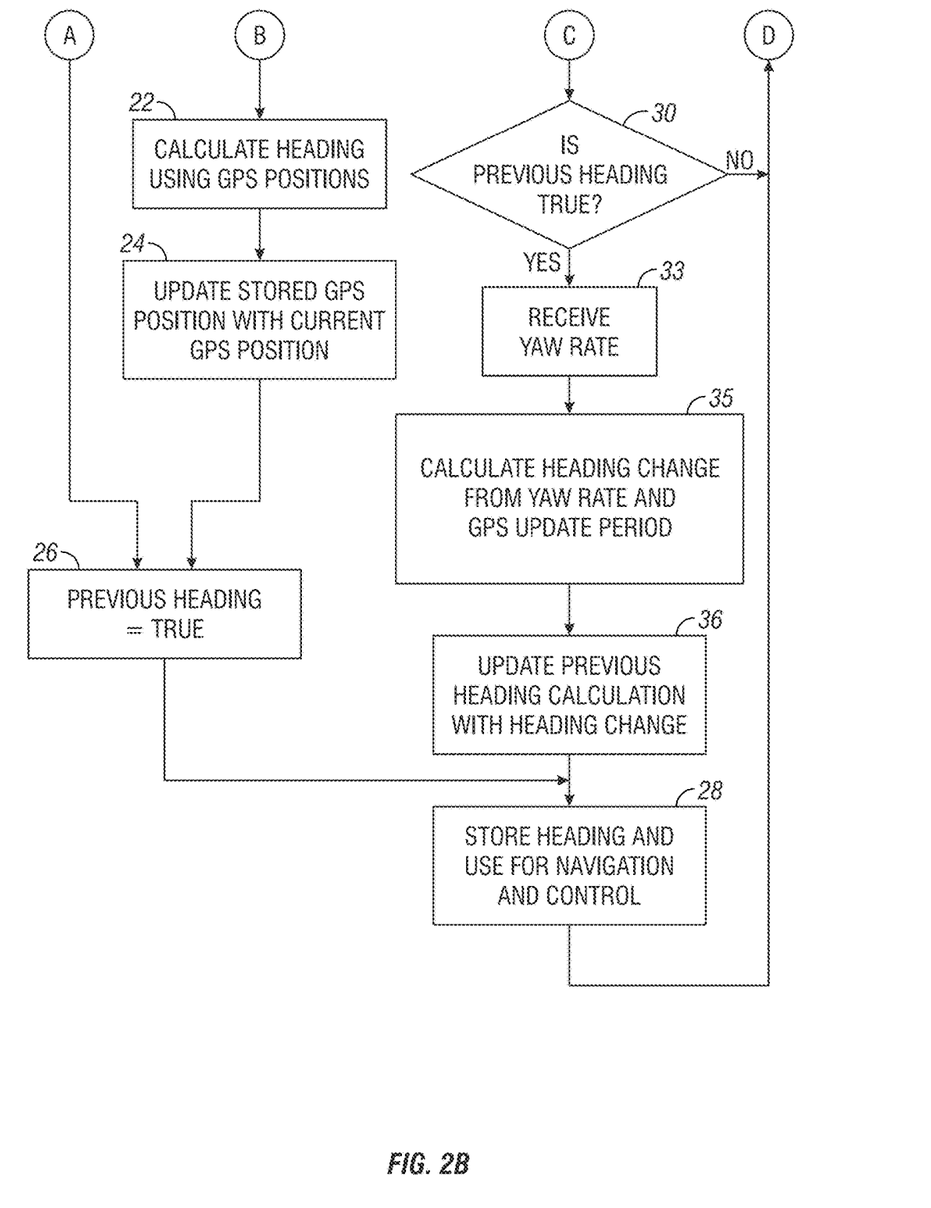

FIG. 2A and FIG. 2B illustrate a flow diagram for an alternative process. The process shown in FIGS. 2A and 2B is similar to that shown in FIG. 1A and FIG. 1B except that the heading change is calculated in a different manner. In FIG. 2B, step 30 a determination is made as to whether the flag Have Previous Heading is true or not. If it is, then in step 33 the yaw rate is received. Next, in step 35, the heading change is calculated from the yaw rate and the GPS update period.

E. System Example 1

Figure 3:
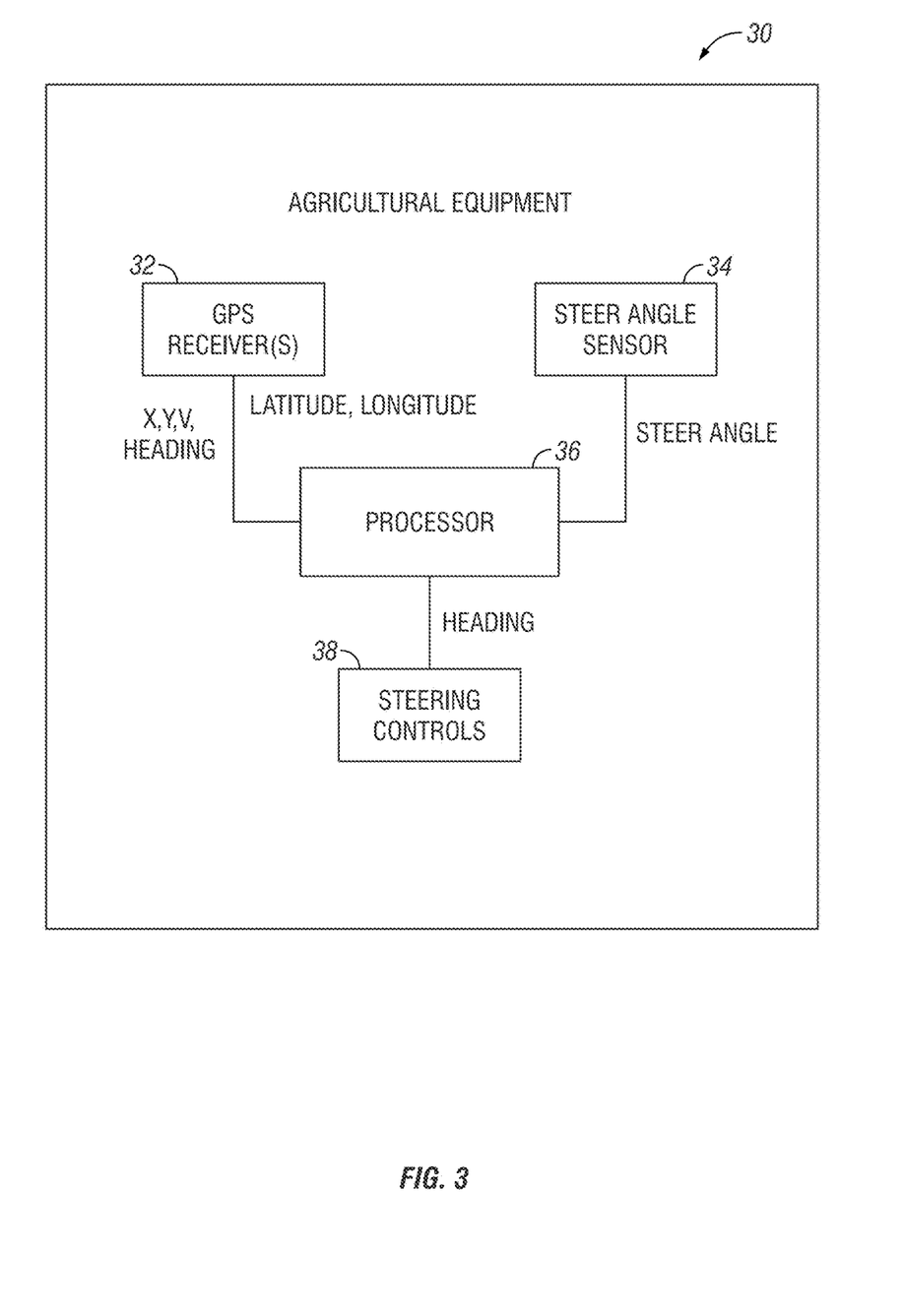
FIG. 3 is a block diagram illustrating one example of agricultural equipment configured with low speed heading measurement where a steer angle sensor is used.

FIG. 3 illustrates a block diagram of agricultural equipment 30 configured with low speed heading measurement. A GPS or other location receiver 32 is shown. Information from the GPS receiver may include latitude and longitude, velocity, and heading. Instead of using latitude and longitude directly, the processor may convert latitude and longitude into X, Y coordinates or into another coordinate system. Also, although velocity may be provided from the GPS receiver 32, velocity may otherwise be provided. Information from the GPS receiver 32 may be periodically updated. Information from the GPS receiver 32 is received at a processor 36. A steer angle sensor 34 is also operatively connected to the processor 36 to provide a steer angle. As an alternative to a steer angle signal from a steer angle sensor, any other signal that equivalently represents the amount of steering that is occurring could also be used. The processor 36 may be programmed to determine a heading such as in the manner previously described. The heading may be communicated to steering controls 38 directly, or may be used to calculate changes in steering which may then be communicated to the steering controls 38 for navigation and/or control.

F. System Example 2

Figure 4:
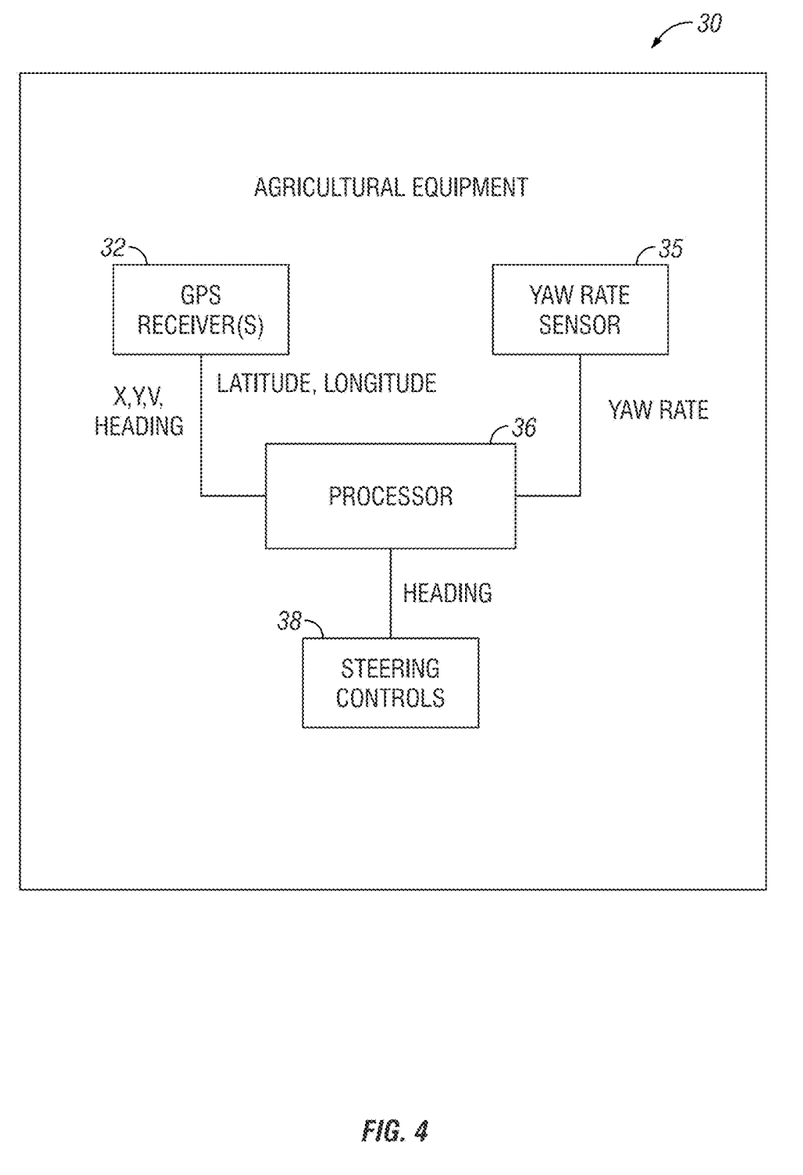
FIG. 4 is a block diagram illustrating another example of agricultural equipment configured with a low speed heading measurement where a yaw rate sensor is used.

FIG. 4 illustrates a block diagram of agricultural equipment 30 configured with low speed heading measurement. In FIG. 4, instead of a steer angle sensor or sensing system, a yaw rate sensor or sensing system 35 is operatively connected to the processor 36. The processor 36 may be programmed to determine a heading using yaw rate as previously described. As an alternative to a yaw rate signal from a yaw rate sensor, any other signal that could be used to represent or determine the rate of turning of the vehicle could also be used.

The low speed heading measurement strategy produces a more accurate heading measurement at the same GPS update rate at all speeds down to zero. It also retains the heading measurement while the vehicle is stopped, and continues to produce a more accurate heading determination as the vehicle starts up again. The improved accuracy of the heading measurement will improve the accuracy of the navigation system and improve steering control.

G. Options and Alternatives

Various methods, apparatus, and systems have been described herein. The present invention is not to be limited to the specific disclosure provided herein as the present invention contemplates numerous variations, additions, and alternatives.

What is claimed is:
1. A method for use in agricultural equipment with automatic steering control and configured to receive information from a Global Navigation Satellite System (GNSS), the method comprising:
(a) determining whether or not to use heading information obtained from GNSS locations at successive sample periods or a different way by:
(1) comparing a speed or distance parameter of the agricultural equipment to a threshold speed or distance,
(2) if the speed or distance parameter of the agricultural equipment is greater than the threshold speed or distance, estimating heading using the heading information determined from GNSS locations at successive sample periods; or
(3) if the speed or distance parameter of the agricultural equipment is less than the threshold steed or distance, estimating heading from information other than the GNSS locations at successive sample periods;
(b) repeating step (a) to promote greater heading accuracy than solely using the heading information obtained from the GNSS locations at successive sample periods, and
(c) using the heading in providing automatic steering control, swath control, or rate control of planting, spraying, or other application functions for the agricultural equipment.

2. The method of claim 1 further comprising receiving the heading information from the GNSS.

3. The method of claim 1 wherein the heading information is derived from the GNSS by calculating the heading information from GNSS locations at successive sample periods.

4. The method of claim 1 further comprising receiving the speed from the GNSS.

5. The method of claim 1 wherein the threshold speed comprises in the range of 1 to 4 mph.

6. The method of claim 1 wherein the determining whether or not to use the heading information determined using GNSS locations at successive sample periods comprises comparing distance between current GNSS position coordinates and previous GNSS position coordinates to determine distance traveled and not using the heading information determined using GNSS locations at successive sample periods if the distance traveled is less than the threshold speed or distance.

7. The method of claim 6 wherein the threshold distance comprises in the range of 3-7 inches.

8. The method of claim 1 wherein the step of estimating heading from information other than the GNSS locations at successive sample periods comprises using:
(a) GNSS position locations other than solely successive GNSS position measurements; or
(b) other than GNSS measurements.

9. The method of claim 8 wherein the information other than the GNSS locations at successive sample periods comprises a parameter related to turning geometry of the agricultural equipment comprising: turning rate, turning radius, the reciprocal of turning radius, or path curvature associated with the agricultural equipment.

10. The method of claim 1 further comprising sensing, related to the agricultural equipment, the information other than the GNSS locations at successive sample periods.

11. The method of claim 10 wherein the information other than the GNSS locations at successive sample periods comprises a steering angle and using the steering angle in estimating the heading.

12. The method of claim 10 wherein the other than the GNSS locations at successive sample periods comprises sensing a yaw rate and using the yaw rate in calculating the heading.

13. The method of claim 1 wherein the step of estimating the heading comprises adding a change in heading to a previously determined heading.

14. A control system for use on the agricultural equipment, the control system configured to perform the method of claim 1.

15. The method of claim 1 wherein the step of estimating the heading occurs after a sufficient change in position relative to stored position coordinates to allow for accurately calculating the heading.

16. The method of claim 1 wherein the GNSS comprises a single antenna.

17. The method of claim 1 comprising repeating step (a) over a period of operation of the agricultural equipment.

18. The method of claim 17 further comprising storing the headings estimations at or just prior to stopping or shutting off the agricultural equipment and utilizing the stored heading estimation on next movement or restart.

19. The method of claim 1 wherein the information other than the GNSS locations at successive sample periods comprises:
   storing position coordinates;
   determining heading from a current position and a stored position coordinates when there is a sufficient change in position between the current position and the stored position coordinates to provide an accurate heading determination.

20. The method of claim 19 wherein the step of determining heading is from a Global Navigation Satellite System (GNSS) position when change in position relative to the stored position coordinates is sufficient for acceptable heading error.

21. The method of claim 19 wherein the sufficient for acceptable heading error is selectable for a given application and comprises a range of on the order of 0° to 1°.

22. A system for use in agricultural equipment with automatic steering control and configured to receive information from a Global Navigation Satellite System (GNSS), including GNSS locations at successive sample periods, the system comprising:
   at least one GNSS antenna associated with the GNSS;
   a processor;
   an input to the processor operatively connected to the GNSS,
   an output from the processor to the automatic steering control;
   a software program associated with the processor which:
      uses the input to derive position and heading,
      determines whether to use (1) at least one of the derived position and heading from GNSS locations at successive sample periods or (2) other than from GNSS locations at successive sample periods, via the output for automatic steering control.

23. The system of claim 22 wherein the other than from GNSS locations at successive sample periods is based at least in part on other than position estimations from the GNSS.

24. The system of claim 23 wherein the other than position estimates from the GNSS comprises sensing with a steering angle or rate sensor and the heading is based on feedback from the steering angle or rate sensor.

25. The system of claim 23 wherein the other than position estimates from the GNSS comprises sensing with a yaw rate sensor and the heading is based on feedback from the yaw rate sensor.

26. The system of claim 23 wherein the GNSS comprises a single antenna.

27. The system of claim 23 in combination with the agricultural equipment and the heading is used for automatic steering, swath control, rate control, or an application function associated with the agricultural equipment;
   wherein the processor estimates a heading to provide greater accuracy than heading information solely obtained using GNSS locations at successive sample periods; and
   using the heading over a period of operation of the agricultural equipment in providing automatic steering control, swath control, or rate control of planting, spraying, or other application functions for the agricultural equipment.

* * * * *

UNITED STATES PATENT AND TRADEMARK OFFICE
CERTIFICATE OF CORRECTION

PATENT NO. : 10,024,977 B1
APPLICATION NO. : 15/047067
DATED : July 17, 2018
INVENTOR(S) : Michael Schneider et al.

Page 1 of 1

It is certified that error appears in the above-identified patent and that said Letters Patent is hereby corrected as shown below:

In the Claims

In Column 8, Claim 1, Line 13:
Delete the word "steed" after the word threshold
Insert the word --speed-- after the word threshold Signed and Sealed this
Eleventh Day of December, 2018

Andrei Iancu
*Director of the United States Patent and Trademark Office*